(12) United States Patent
Andersen (10) Patent No.: US 9,021,043 B2
(45) Date of Patent: Apr. 28, 2015

(54) MESSAGE GATEWAY WITH HYBRID PROXY/STORE-AND-FORWARD LOGIC

(75) Inventor: Hans Christian Andersen, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 612 days.

(21) Appl. No.: 12/892,769

(22) Filed: Sep. 28, 2010

(65) Prior Publication Data

US 2012/0079036 A1    Mar. 29, 2012

(51) Int. Cl.
  G06F 15/16    (2006.01)
  H04L 12/58    (2006.01)

(52) U.S. Cl.
  CPC ........... H04L 12/585 (2013.01); H04L 12/5855 (2013.01); H04L 51/12 (2013.01)

(58) Field of Classification Search
  CPC .......................... H04L 12/585; H04L 12/5855
  USPC ........... 709/206, 207; 707/100, 613; 713/170, 713/181; 726/3
  See application file for complete search history.

(56) References Cited

U.S. PATENT DOCUMENTS

| | | | |
|---|---|---|---|
| 6,654,787 B1 * | 11/2003 | Aronson et al. | 709/206 |
| 7,117,533 B1 * | 10/2006 | Libenzi | 726/24 |
| 7,249,175 B1 * | 7/2007 | Donaldson | 709/225 |
| 7,392,281 B1 | 6/2008 | Kanojia | |
| 7,756,979 B1 | 7/2010 | Staack et al. | |
| 2002/0010781 A1 | 1/2002 | Tuatini | |
| 2004/0215977 A1 * | 10/2004 | Goodman et al. | 713/201 |
| 2005/0015454 A1 * | 1/2005 | Goodman et al. | 709/207 |
| 2005/0044155 A1 * | 2/2005 | Kaminski et al. | 709/206 |
| 2005/0091322 A1 * | 4/2005 | Hogstrom et al. | 709/206 |
| 2006/0031359 A1 * | 2/2006 | Clegg et al. | 709/206 |
| 2006/0155810 A1 | 7/2006 | Butcher | |
| 2007/0083929 A1 * | 4/2007 | Sprosts et al. | 726/22 |
| 2009/0019126 A1 * | 1/2009 | Adkins | 709/206 |
| 2009/0100138 A1 * | 4/2009 | Harris | 709/206 |
| 2009/0157708 A1 * | 6/2009 | Bandini et al. | 707/100 |

OTHER PUBLICATIONS

Crocker, D., "Internet Mail Architecture", Retrieved at <<www.bbiw.net/specifications/draft-crocker-email-arch-03.htrnl>>, Feb. 2005, pp. 23.

Myers, J., "Local Mail Transfer Protocol", Retrieved at <<http://tools.ietf.org/html/rfc2033>>, Oct. 1996, pp. 15.

(Continued)

*Primary Examiner* — Aftab Nasir Khan
(74) *Attorney, Agent, or Firm* — Louise Bowman; Jim Ross; Micky Minhas (57) ABSTRACT

Described is a technology by which an email filtering service or other gateway includes hybrid proxy and store-and-forward logic. A message is initially processed with proxy logic. If the proxy logic is unable to complete filtering/scanning of a message within a timeout period, the store-and-forward logic is invoked to complete filtering/scanning of the message. The store-and-forward logic also may be invoked if a delivery attempt made by the proxy logic fails or does not complete prior to a delivery timeout period. When such a condition is met, the store-and-forward logic accepts the message, including storing the message, sending a response that indicates the message was accepted, and closing the connection over which the message was received. The store-and-forward logic may complete any scanning if not completed by the proxy logic, and takes over delivery responsibilities.

20 Claims, 7 Drawing Sheets

(56) References Cited

OTHER PUBLICATIONS

Robert Von Behren, J., et al., "NinjaMail: The Design of a High-performance Clustered, Distributed E-mail System", May 2001, pp. 8.

Ott, Jorg, et al., "Why Seamless? Towards Exploiting WLAN-Based Intermittent Connectivity on the Road", 2004, pp. 15.

"Google Message Security", Retrieved at <<www.google.com/postini/email.html, Retrieved on Jul. 27, 2010, pp. 1.

* cited by examiner

FIG. 7

MESSAGE GATEWAY WITH HYBRID PROXY/STORE-AND-FORWARD LOGIC

BACKGROUND

With hosted email filtering services, outside client senders attempting to send a mail message to a SMTP (simple mail transport protocol) delivery system are instead directed to an email filtering service/server (hereinafter "filtering service" for brevity). The filtering service, commonly implemented as an SMTP relay or gateway, either accepts or rejects the message. For example, messages from known bad senders (e.g., "spammers") may be rejected. If the message is accepted, the filtering service has responsibility for communicating the message to the delivery SMTP system.

The filtering service scans the message header and body in order to handle undesirable messages differently from other messages. In general, with respect to receiving messages, scanning them and delivery communications, such filtering services use either "proxy" semantics or "store-and-forward" semantics. Each type of semantics has benefits and drawbacks.

Proxy semantics operate over a TCP connection between the outside SMTP sending client and the filtering service, and a similar connection between the filtering service and the delivery system. A proxy-based filtering service processes (scans) messages and proxies communications back and forth to and from the delivery server and sender, without writing the message to disk or taking formal responsibility for the message. This is simple, inexpensive, facilitates high throughput, introduces relatively little latency for most messages, and avoids the need for sending bounce messages/NDRs (Non-Delivery Reports/Receipts) or quarantining messages.

However, with proxy semantics, the connection between the outside client and the filtering service has to be held open while scanning takes place; for slow connections and/or large messages (including messages with large attachments), this can be error-prone. Further, if a transient error occurs while attempting to deliver to the delivery system, the entire conversation needs to unwind and be retried later, including performing redundant scanning on the resubmitted message. Still further, when under heavy load, a proxy-based filtering service may not be able to handle received messages, and instead has to return a response (e.g., a 400-level response) to the outside sending clients that basically instructs those clients to try again later.

In contrast, store-and-forward type filtering services write each accepted input message to disk and then close the connection with the outside sender. Store-and-forward type filtering services then process the message as needed, and maintain it until the forwarding of the message to the delivery system is successful. This provides more predictable and reliable results in specific situations, such as when the delivery system (destination mail server) is unavailable, or when a message is particularly large. By storing messages, large messages including messages with large attachments can be analyzed without needing to hold open TCP connections. Further, transient errors may be overcome by re-attempting message sending until successful, without subjecting the message to redundant filtering. Still further, if the filtering service is under heavy load, the filtering service can still accept mail, which remains queued until the load lessens.

However, drawbacks to store-and-forward semantics include that storage is costly. Further, rejected mail needs to be handled somehow, as deleting the mail is counter to the SMTP specification, while NDR bounce notices that are sent are often mistaken as spam. Quarantining messages adds storage costs. Still further, there is more latency in end-to-end delivery, and there is a risk of mail loss if the filtering service crashes or fails after taking formal responsibility for a message, but before the message is delivered.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in a gateway/relay such as an email filtering service that includes proxy and store-and-forward logic. When an electronic message (e.g., email message) is received, the message is initially processed with proxy logic. The service (e.g., the proxy logic therein) may determine to further process the message with the store-and-forward logic based upon detection of one or more conditions. For example, one condition may be that the proxy logic is unable to complete filtering scanning of a message within a timeout period, whereby the proxy logic invokes the store-and-forward logic to complete processing of the message. Other conditions include that a delivery attempt made in the proxy logic has not completed prior to a delivery timeout period, or failed, e.g., due to a transient error.

When such a condition is met, the store-and-forward logic accepts the message, including storing the message, sending a response that indicates the message was accepted, and closing the connection over which the message was received. The store-and-forward logic may complete any scanning if not completed by the proxy logic. The message (if not blocked by any scanning) is queued for delivery, and delivery attempted, which may be reattempted (e.g., if a transient error occurs) until the message is delivered, Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an email filtering service that exhibits proxy semantics, yet is capable of dynamically operating with a store-and-forward semantics as needed, such as under abnormal conditions or for large messages. The email filtering service may dynamically adopt proxy and/or store-and-forward semantics on a per-message basis or per-connection basis (e.g., some set of messages on a connection). For example, most messages are sent using proxy semantics, however if a transient message delivery error occurs on a given message, or a specified timeout elapses, the filtering service in general behaves like a store-and-forward filtering service, e.g., accepts and stores the message until delivered.

It should be understood that any of the examples herein are non-limiting. As one example, while email messages are described, any other type of electronic communications may benefit from the technology described herein. Further, while the gateway/relay is exemplified herein as a filtering service, a gateway/relay routing service (that does not necessarily perform filtering) may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data communications in general.

Figure 1:
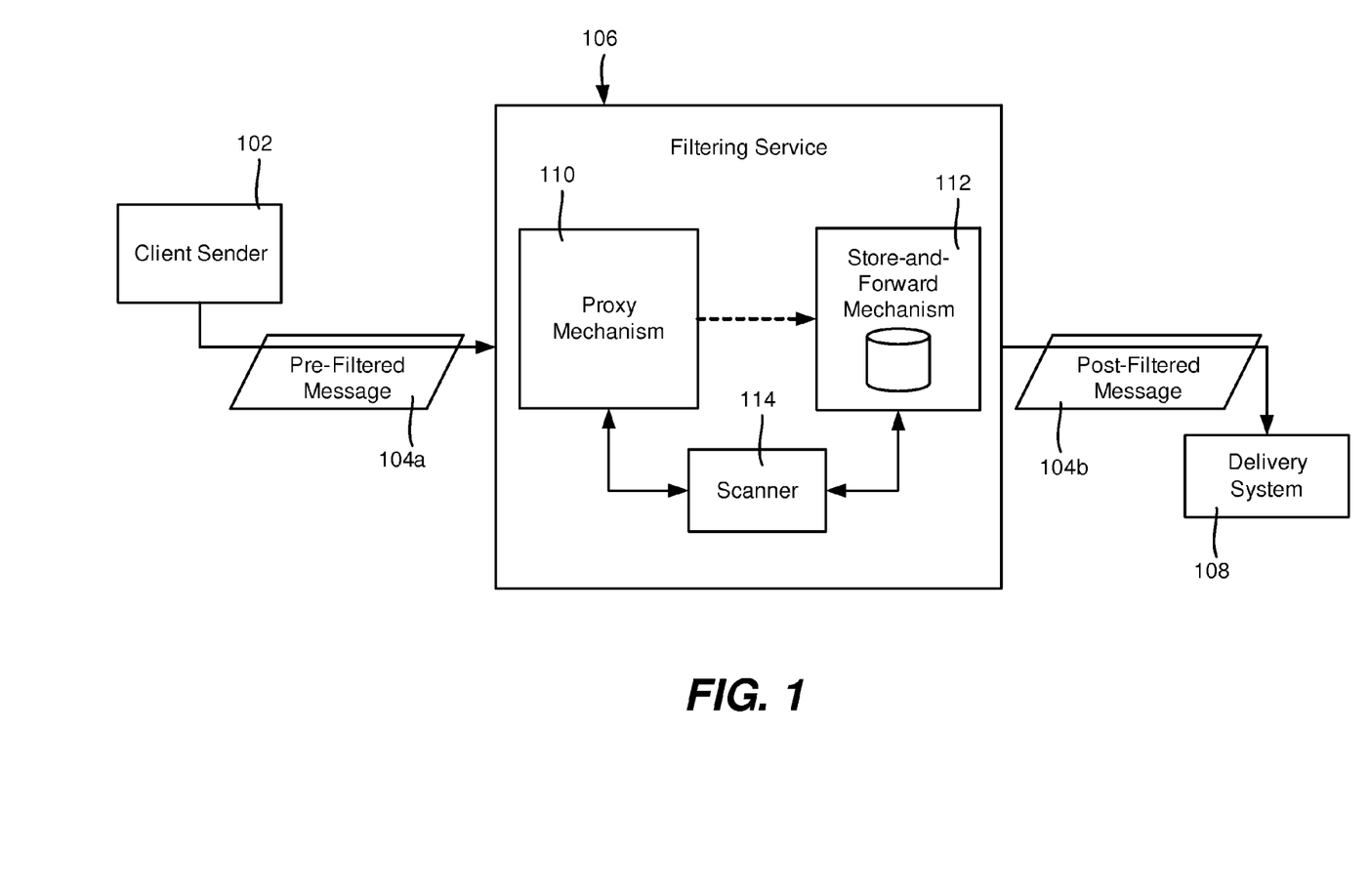
FIG. 1 is a block diagram representing example components and electronic message data flow in a hybrid proxy/store-and-forward filtering service.

FIG. 1 shows a block diagram in which a client sender 102 sends a message 104a intended for a delivery recipient, which is actually first directed to a filtering service 106. As will be understood, if not blocked via filtering, the filtering service 106 attempts to communicate the message 104b to a delivery system 108.

Initially the communication is by a proxy mechanism 110 (logic) that implements proxy semantics. However, if proxy-based forwarding does not work as desired, the message is instead provided to a store-and-forward mechanism 112 (logic) that implements store-and-forward semantics. As described below, message scanning (as represented by the scanner 114) may take place while the message is being processed by the proxy mechanism 110, while the message is being processed by the store-and-forward mechanism 112, or partially during proxy mechanism 110 processing and partially during store-and-forward mechanism 112 processing.

Figure 2:
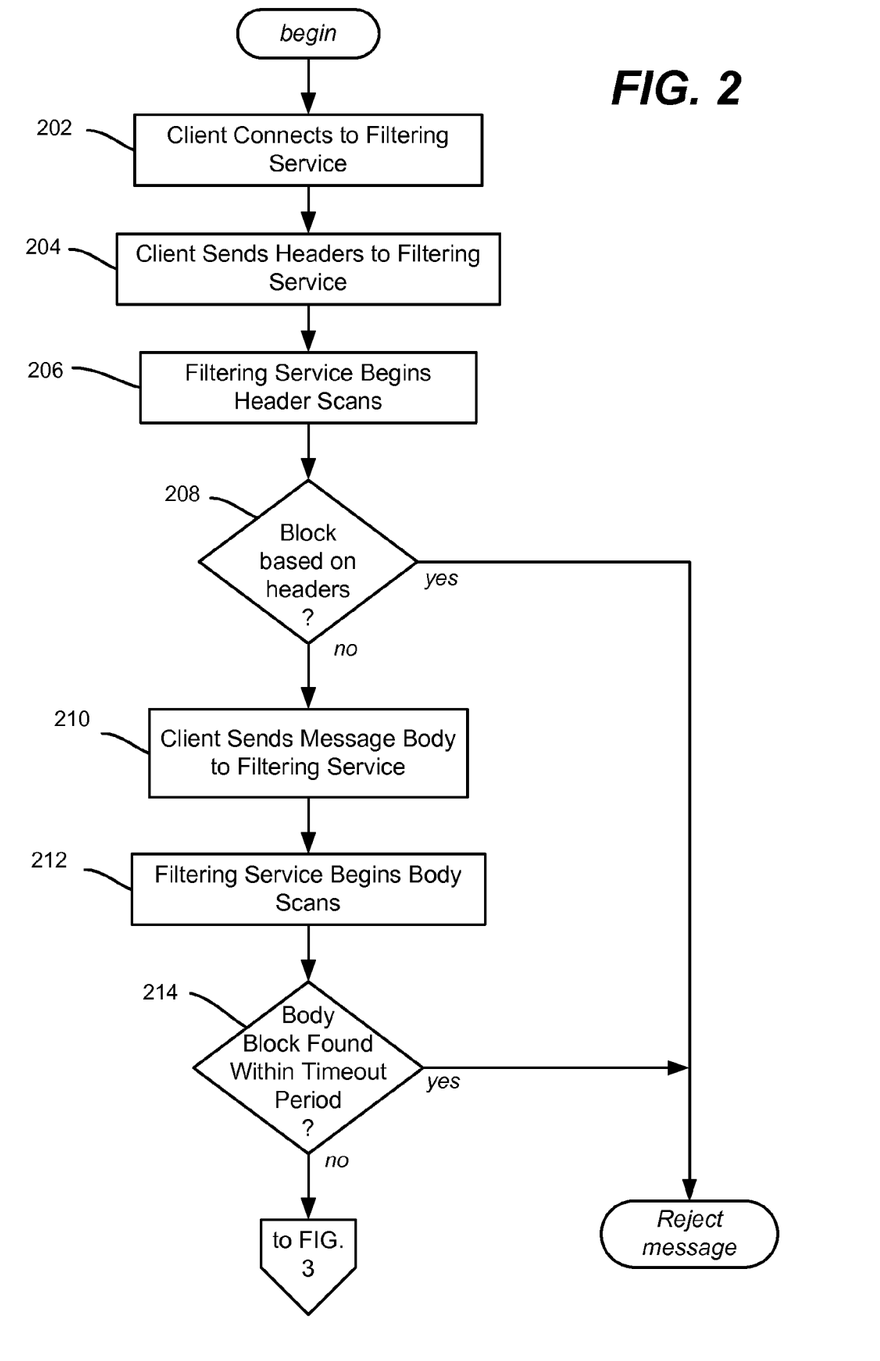
FIGS. 2-4 comprise a flow diagram showing proxy logic interacting with store-and-forward logic for filtering and delivering electronic messages.
Figure 3:
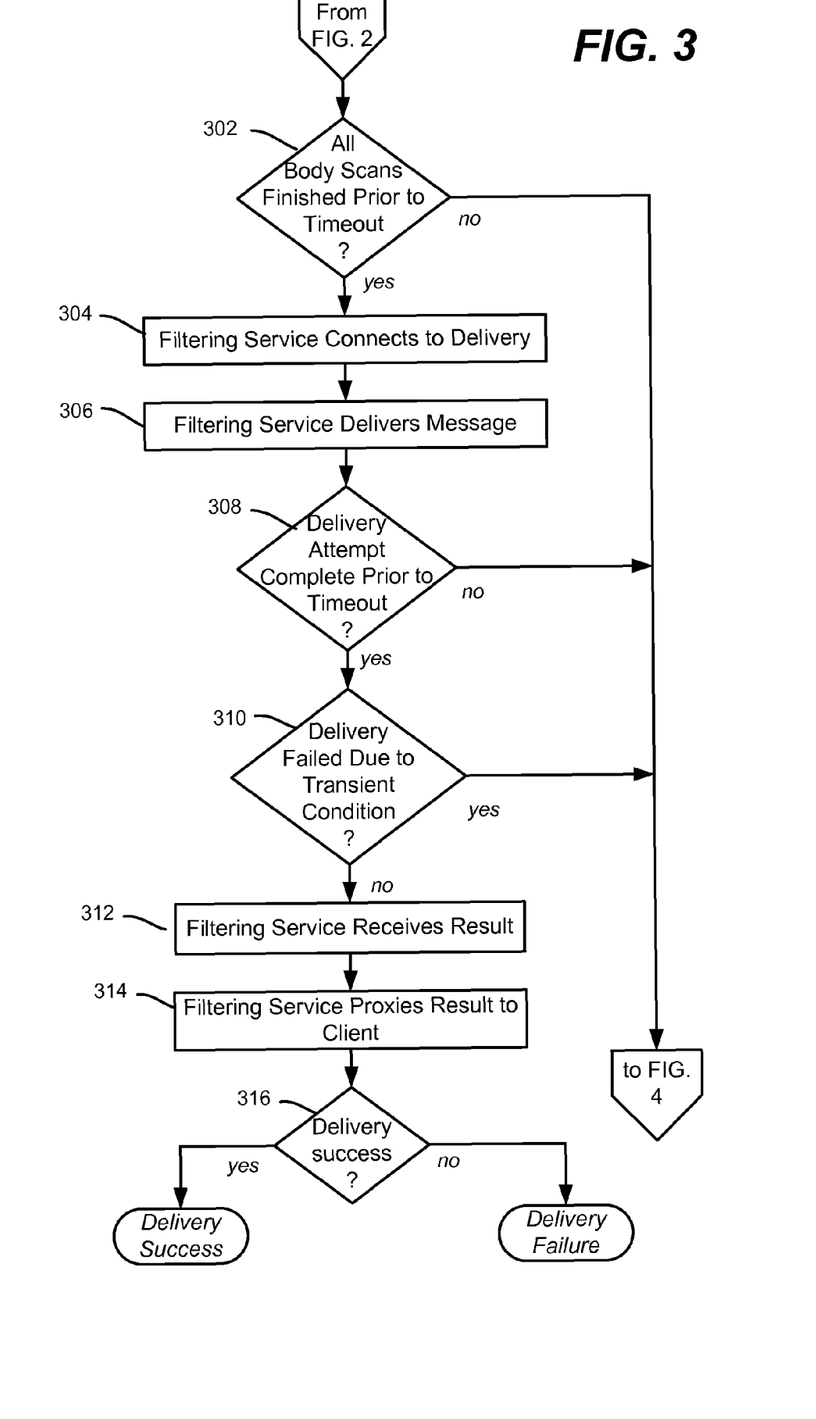
Figure 4:
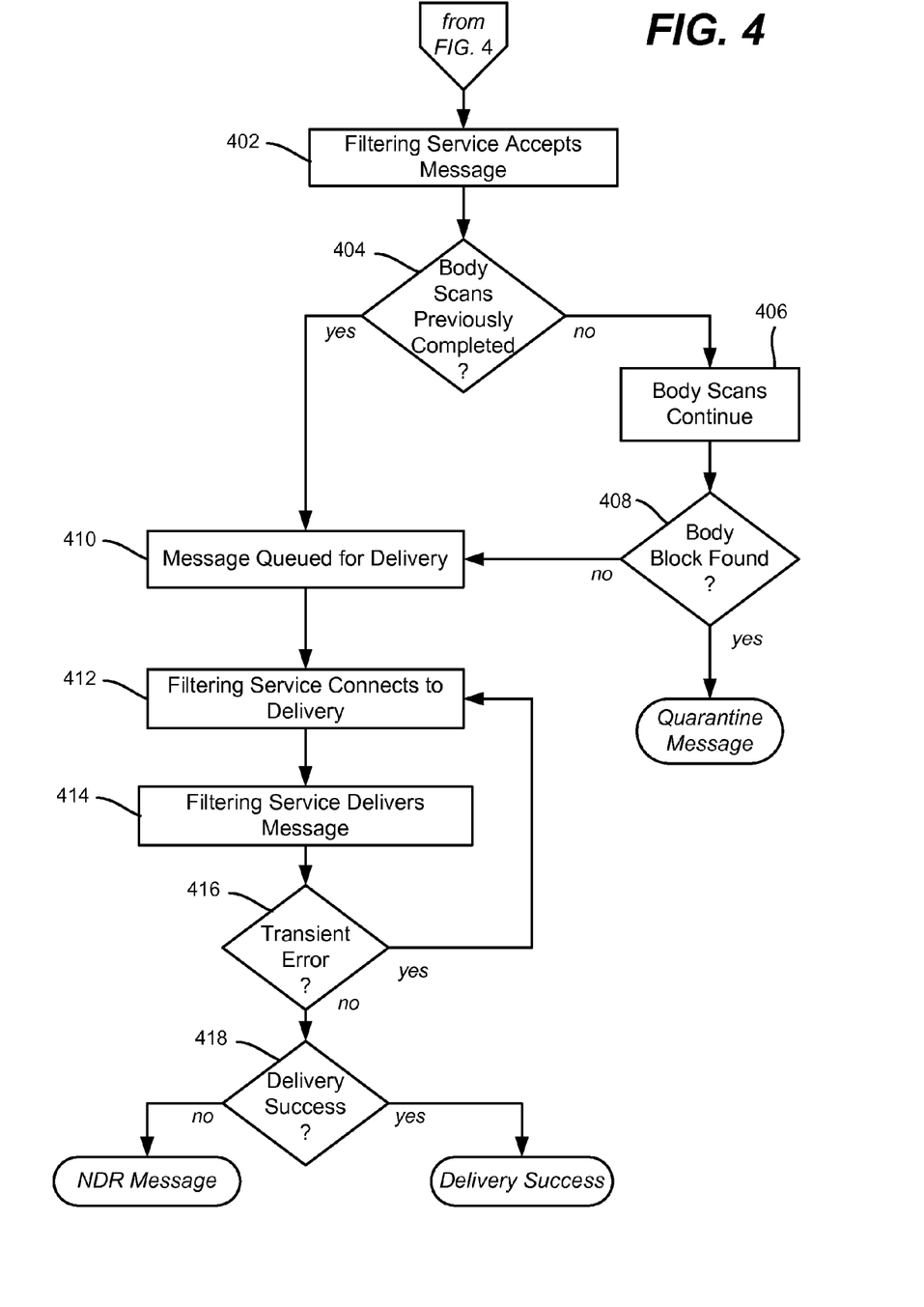

FIGS. 2-4 comprise a flow diagram representing example steps performed by the proxy mechanism 110 (generally FIGS. 2 and 3) and the store-and-forward mechanism 112 (generally FIG. 4). Step 202 represents the client sender connecting to the filtering service 106, e.g., as directed by a DNS service, and step 204 represents the client sender sending message headers to the filtering service 106.

At this time, proxy semantics are operational, and the incoming connection is kept open while the filtering service performs (relatively fast) header scans on the message. As is known, many messages are rejected based on their header data, which is represented by step 208 branching to reject the message.

If not blocked at step 208, the client sends the message body to the filtering service 106, which begins scanning the message at step 212. Depending on the message body size, including any attachments, the body scan may be completed relatively quickly or relatively slowly.

As represented by step 214, the scan continues while the connection remains open for up to a timeout period, which may be configurable by the administrator or the like of the filtering service. During this scan, if the message body contains content that is blocked, the message is rejected, which is represented by step 214 branching to reject the message. If the body scan completes without blocking, the process continues to FIG. 3 as described below.

In contrast to conventional proxy-based filtering, the timeout period at step 214 may be reached before the scan completes on a message that has not been blocked (although the message may be blocked later). If so, the process continues the scan using store-and-forward logic, as described below.

More particularly, step 302 determines whether the body scans have completed or whether the timeout period has been reached. If not completed, step 302 branches to FIG. 4, described below, where store-and-forward semantics are implemented.

If the scans are complete, the message is attempted to be delivered, still maintaining proxy semantics at this time. To this end, the filtering service 106 connects to the delivery system (step 304) and attempts to deliver the message (step 306). However, there may be problems with the attempt, as represented by step 308 timing out the attempt, or step 310 detecting delivery failure from a transient condition. If such a condition occurs, the process branches to FIG. 4, described below, for processing by the store-and-forward logic.

Step 312 represents receiving the result from the delivery service, which is returned to the client sender at step 314. As with conventional proxy operations, because there was no condition that triggered store-and-forward processing, the success or failure (step 316) is returned to the client sender without the filtering service having stored or otherwise taken any responsibility for handling the message, other than generally scanning it.

Turning to store-and-forward aspects that occur under a condition such as described above, step 402 of FIG. 4 represents the filtering service accepting the message, including storing it and taking responsibility for attempting delivery. For example, the filtering service closes the connection with the client after returning an appropriate response (e.g., a 250 OK response) and formally taking ownership of the message. The message is subsequently handled with the store-and-forward logic. Note that if the body scans have not completed (e.g., FIG. 4 was reached via step 302 of FIG. 3), then they are continued at step 406, where the message may be blocked (quarantined) via step 408.

If the scans have completed without blocking, or the store-and-forward logic of FIG. 4 was reached via step 308 or 310, the message is queued for delivery at step 410. Steps 412 and 414 represent the attempt to connect and deliver the message, which may be re-attempted in view of a transient error (at least some number of times) via step 416, that is, the message is re-queued (or not dequeued) and a retry attempted later. In the event the delivery is not successful, step 418 returns an NDR message to the client sender.

Note that the above flow diagram steps are only examples, and other ways to switch from proxy operations to store-and-forward operations may be implemented. For example, a message that is large may be more directly handled by the store-and-forward logic, such that the proxy logic need not perform scanning up to the time limit but switch that message to the store-and-forward logic sooner, freeing proxy-related resources for scanning other messages. During times of high load, the filtering service may also provide messages to store-and-forward logic, e.g., without necessarily involving the proxy logic. As another alternative, multiple messages on the same connection may be received, and as soon as any one of those messages is handled by the store-and-forward logic, any messages thereafter may be handled by the store-and-forward logic as well, (e.g., to help keep those messages in order). In general, the filtering service may switch to store-and-forward logic instead of proxy logic at any time for any given message.

As can be seen, in this hybrid model, proxy semantics are used when possible, e.g., except for conditions deemed unusual, such as time-consuming scans, delivery timeouts, or delivery failures due to transient conditions. For a large majority of messages under normal conditions, the advantages of proxy semantics are obtained, e.g., small messages that can be expediently scanned and delivered impose no storage or disk I/O cost on the filtering service.

For other situations, store-and-forward semantics are used. Doing so overcomes the drawbacks of proxy-based filtering that result with respect to large messages/abnormal conditions, including when scans on the message body take longer than a desired timeout period, message delivery cannot be completed within a desired timeout period, or message delivery fails due to a transient error. In this store-and-forward part of the hybrid model, connections are not held open for significant amounts of time, which frees up network ports for the client and filtering service.

Further, note that any scanning, processing, or other activities that were completed prior to accepting the message need not be repeated after acceptance. Thus, the total amount of processing that is performed on any message is basically unchanged; a difference is the division of labor between the client and the filtering service in dealing with messages that cannot be delivered in a timely fashion. Messages do not have to pass through the filtering service more than once, as the client is shielded from any transient errors that may originate from the delivery server. For example, if the delivery server is temporarily down, this fact is masked from the client.

Figure 5:
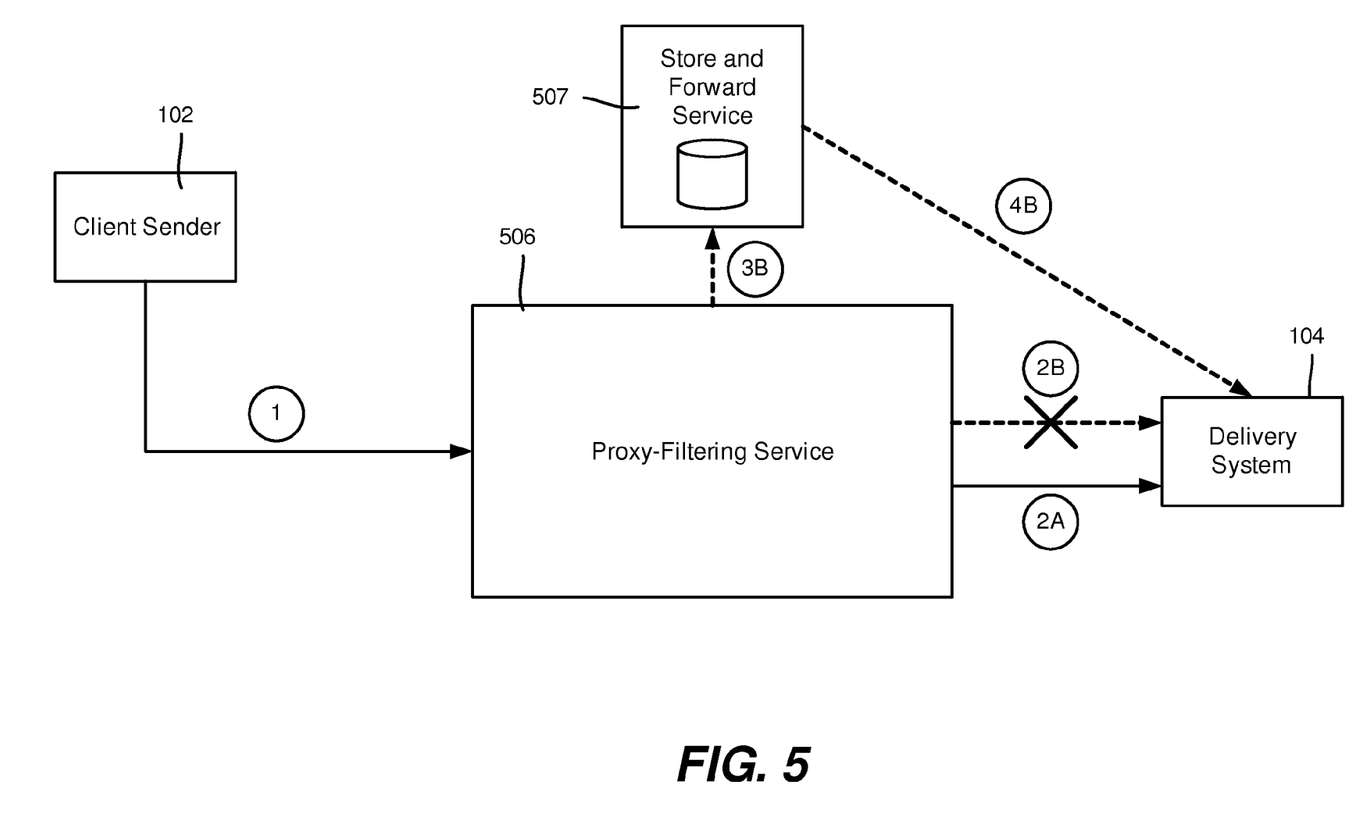
FIG. 5 is representation of an alternative hybrid proxy/store-and-forward filtering service implemented with multiple services/servers.
Figure 6:
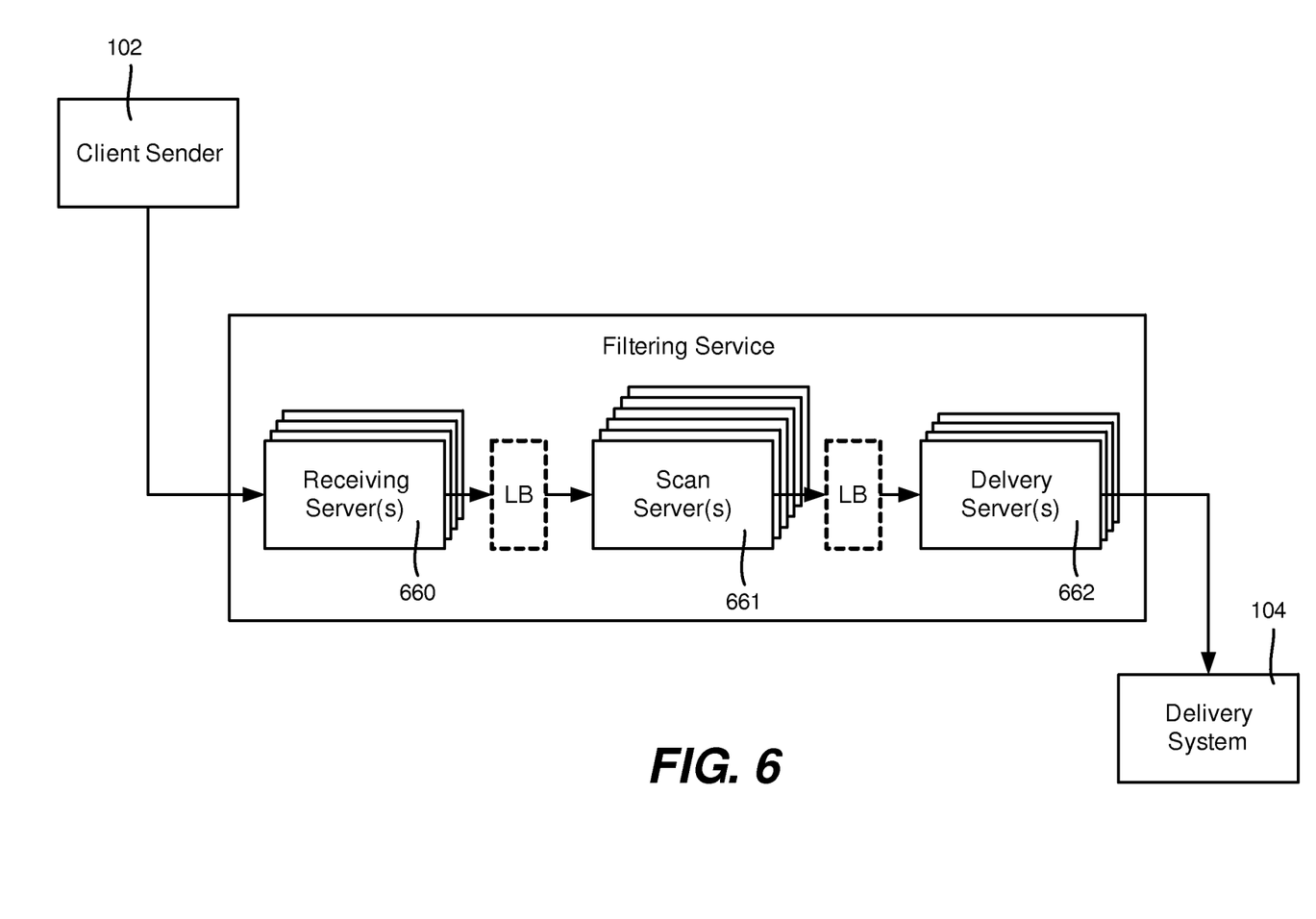
FIG. 6 is representation of an alternative hybrid proxy/store-and-forward filtering service implemented with pools and/or chains of servers.

Turning to alternative implementations, FIGS. 5 and 6 are representations of a large-scale service deployment that handles email filtering and/or routing via a hybrid model as described above, using pools of servers and/or chained servers. In the alternative of FIG. 5 for example, a message may handled by a plurality of services/servers 506, 507 generally having different configurations to match their roles/functionalities. For example, a sender 102 sends a message (the arrow labeled (1)) to a proxy part of the filtering service 506, which may comprise one or more servers. If scanning and delivery (or routing) are able to be performed by this proxy service 506, then the message is sent via proxy logic (the arrow labeled (2)).

However, upon hitting a condition where the message is not scanned in time or not delivered as described above, (the crossed-out, dashed arrow labeled (2B)), the message may be handed off to a separate service 507 (server(s) or subsystem) within the filtering service for scanning completion and/or delivery (dashed arrows 3B and 4B). This allows a main part of the filtering service to contain purely stateless hosts (which are amenable to virtualization), while permitting the stateful store-and-forward duties to be on a service 507 comprising one or more other more appropriately-configured machines, e.g., disk-heavy units and/or machines with dedicated redundant storage.

FIG. 6 shows another alternative implementation, (which also may be configured with a multiple-part service as in FIG. 5). In FIG. 6, different aspects of message handling, e.g., receiving, scanning and delivery are handled by different sets of servers 660-662, respectively, with any load balancing (LB) performed in between as needed. Note that any set of servers may be configured for hybrid proxy/store-and-forward processing.

Exemplary Operating Environment

Figure 7:
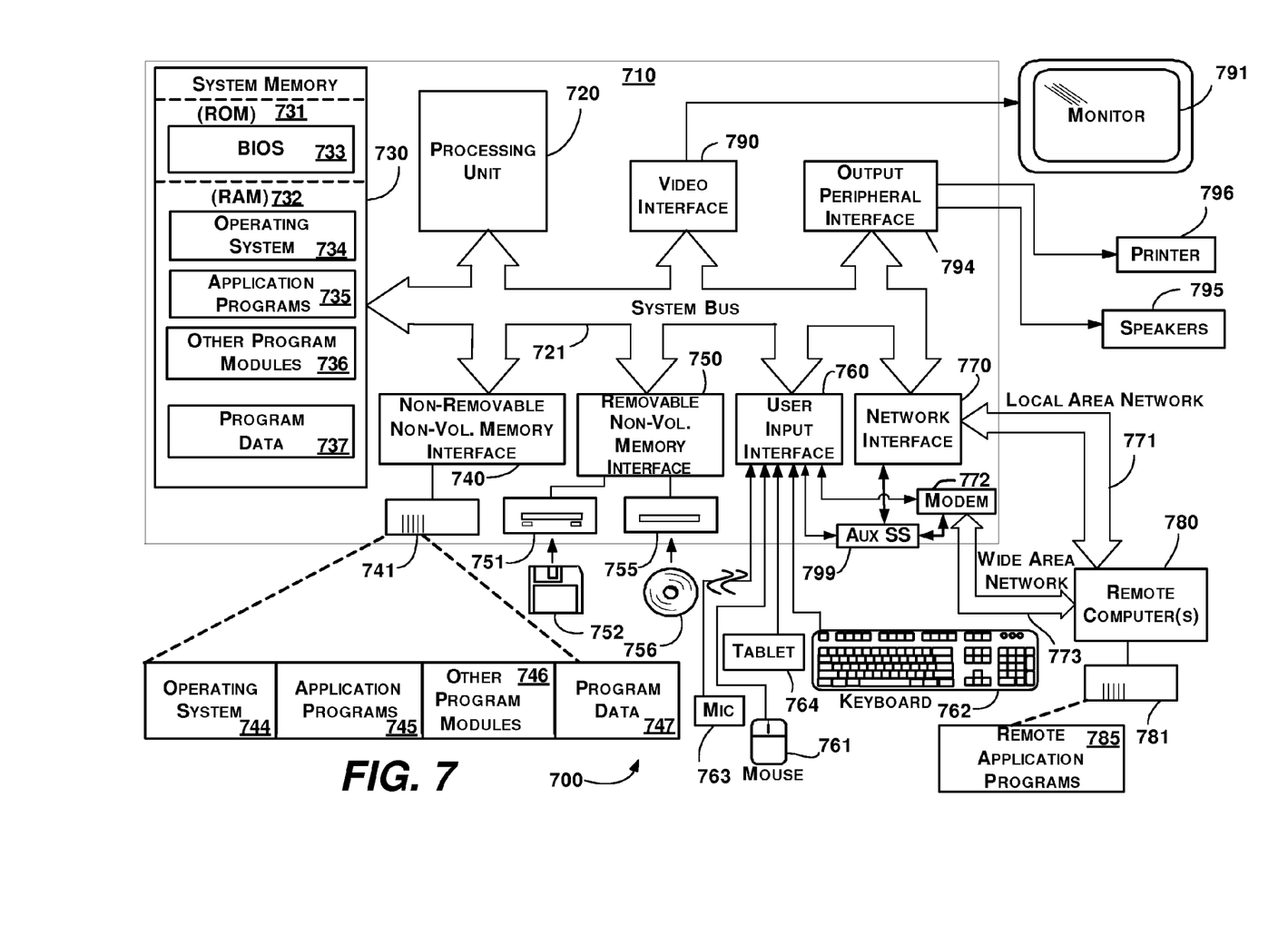
FIG. 7 shows an illustrative example of a computing environment into which various aspects of the present invention may be incorporated.

FIG. 7 illustrates an example of a suitable computing and networking environment 700 into which the examples and implementations of any of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   receiving, by a gateway equipped with at least one processor, an electronic message from a client sender that is intended for a delivery system, the gateway including proxy logic and store-and-forward logic;
   processing the electronic message using the proxy logic, including performing one or more scans of the electronic message;

determining whether the electronic message is to be blocked based on header data;

responsive to the determination that the electronic message is to be blocked based on the header data, rejecting the message using the proxy logic;

responsive to the determination that the electronic message is not to be blocked based on the header data, continuing to process the electronic message using the proxy logic to perform the one or more scans during a timeout period determining whether to continue processing the electronic message using the proxy logic or the store-and-forward logic based upon one or more conditions, the one or more conditions including at least one of a timeout period, a delivery failure, a transient condition, a current load, or a message size, wherein determining whether to continue processing the electronic message further comprises:

determining whether the one or more scans were completed within the timeout period;

responsive to the determination that the one or more scans were completed within the timeout period, continuing to process the electronic message using the proxy logic; and responsive to the determination that the one or more scans were not completed during the timeout period, continuing to process the electronic message using the store-and-forward logic to complete the one or more scans;

responsive to the determination to continue processing the electronic message using the proxy logic, maintaining a connection with the client sender over which the electronic message was received; and responsive to the determination to continue processing the electronic message using the store-and-forward logic, closing the connection with the client sender over which the electronic message was received and further processing the electronic message using the store-and-forward logic.

2. The method of claim 1 wherein performing the one or more scans of the electronic message includes at least one of performing one or more scans of header data or performing one or more scans of body data.

3. The method of claim 1 wherein determining whether the one or more scans of the electronic message using the proxy logic completed during the timeout period further comprises:

determining whether the one or more scans completed included all body scans of the electronic message prior to the timeout period ending;

responsive to the determination that the one or more scans finished all the body scans of the electronic message prior to the timeout period ending, continuing to process the electronic message using the proxy logic; and responsive to the determination that the one or more scans did not finish all the body scans of the electronic message prior to the timeout period ending, continuing to process the electronic message using the store-and-forward logic to complete scanning of the electronic message.

4. The method of claim 1 wherein further processing the electronic message using the store-and-forward logic comprises:

determining whether at least one scan of the one or more scans of the electronic message results in a message block;

responsive to the determination that the at least one scan does not result in the message block, queuing the message for delivery; and responsive to the determination that the at least one scan results in the message block, quarantining the electronic message.

5. The method of claim 1 wherein determining whether to continue processing the electronic message using the proxy logic or the store-and-forward logic based upon the one or more conditions comprises:

determining whether a delivery attempt of the electronic message using the proxy logic has completed prior to a delivery timeout period ending;

responsive to the determination that the delivery attempt has completed prior to the delivery timeout period ending, sending a delivery success message to the client sender using the proxy logic; and responsive to the determination that the delivery attempt has not completed prior to the delivery timeout period ending, continue processing the electronic message with the store-and-forward logic, including accepting the responsibility for delivery of the electronic message, storing the electronic message, and reattempting delivery of the electronic message using the store-and-forward logic.

6. The method of claim 1 wherein the determining whether to continue processing the electronic message using the proxy logic or the store-and-forward logic is dynamically determined based on at least one of a per-message basis or a per-connection basis.

7. The method of claim 1 wherein any processing activities completed by the proxy logic prior to the determination that the store-and-forward logic will continue processing the electronic message are not repeated.

8. The method of claim 1 further comprising:
queuing the electronic message for delivery and
attempting to deliver the electronic message.

9. The method of claim 1 further comprising:
receiving a plurality of messages from the client sender over a same connection;

determining whether at least one of the plurality of messages is being processed using the store-and-forward logic; and responsive to the determination that the at least one of the plurality of messages is being processed using the store-and-forward logic, processing remaining messages of the plurality of messages on the same connection using the store-and-forward logic.

10. In a computing environment, a system implementing an electronic message processing service comprising:

at least one processor;

a memory communicatively coupled to the at least one processor and configured to implement the electronic message processing service; and a gateway equipped with the at least one processor, the gateway including proxy logic and store-and-forward logic for processing messages, the gateway configured to receive one or more messages from at least one client sender and to process each message using at least one of the proxy logic or the store-and-forward logic based upon one or more conditions, the one or more conditions including at least one of a timeout period, a delivery failure, a transient condition, a current load, or a message size, the gateway configured to determine whether a given message is to be blocked based on header data, responsive to the determination that the given message is to be blocked based on the header data, reject the given message, responsive to the determination that the given message is not to be blocked based on the header data, continue to process the given message using the proxy logic to perform one or more scans during a timeout period,
determine whether the one or more scans were completed within the timeout period, responsive to the determination that the one or more scans were completed within the timeout period, continue to process the electronic message using the proxy logic, responsive to the determination that the one or more scans were not completed during the timeout period, continue to process the electronic message using the store-and-forward logic to complete the one or more scans,
the gateway further configured to invoke the proxy logic to establish and maintain an open connection for the timeout period, and invoke the store-and-forward logic to close the connection when the timeout period elapses.

11. The system of claim 10 wherein the gateway comprises an email filtering service configured to perform the scan of the one or more messages during the timeout period, and wherein the message scan on a given message comprises one or more message header scans and one or more message body scans.

12. The system of claim 10 wherein the gateway is further configured to attempt delivery of the given message using the proxy logic, including by queuing the given message for delivery, when the scan of the given message is completed and the given message is accepted during the timeout period.

13. The system of claim 10 wherein the gateway is further configured to store and re-attempt delivery of the given message until the given message is successfully delivered using the store-and-forward logic when delivery of the given message is unsuccessful during a timeout period associated with the proxy logic.

14. The system of claim 10 wherein the gateway is further configured to determine when to invoke the store-and-forward logic based upon at least one of a per-message basis or a per-connection basis.

15. The system of claim 10 wherein the gateway is further configured to close the connection established by the proxy logic with the at least one client sender when the gateway invokes the store-and-forward logic to accept, store, and take responsibility for attempting delivery of a given message.

16. The system of claim 10 wherein the scan of the one or more messages occurs while the one or more messages are being processed by the proxy logic, or while the message is being processed by the store-and-forward logic, or partially while the one or more messages are being processed by the proxy logic and partially while the one or more messages are being processed by the store-and-forward logic.

17. The system of claim 10 wherein the gateway is further configured to scan header data associated with the given message using proxy logic to determine when the given message will be accepted or rejected, and scan body data associated with the given message when the message is accepted based on the header data using proxy logic during a timeout period, the gateway further configured to scan the body data using the store-and-forward logic when the body data scan is not completed by the proxy logic during the timeout period.

18. One or more computer storage devices having computer-executable instructions, which when executed by a computer cause the computer to perform steps, comprising:
establishing and maintaining an open connection with a client sender over which an electronic message is received using proxy logic;
filtering the electronic message, including scanning one or more message headers to determine whether to block the electronic message;
responsive to the determination to block the electronic message based on the one or more message headers, rejecting the electronic message;
responsive to the determination not to block the electronic message based on the one or more message headers, performing a message body scan;
determining whether the message body scan completed within a timeout period;
responsive to the determination that the message body scan completed within the timeout period, attempting delivery of the message;
responsive to the determination that delivery of the message was successful, returning a result to the client sender of the electronic message using the proxy logic, closing the connection, and ending the process;
responsive to the determination that the message body scan was not completed within the timeout period, or that delivery of the message was not successful, accepting responsibility for the electronic message using store-and-forward logic, including storing the message, accepting responsibility for delivery of the electronic message by returning a response to the client sender of the electronic message, and closing the connection with the client sender;
determining whether the message body scan completed during the proxy logic processing;
responsive to the determination that the message body scan was not completed during the proxy logic processing, completing the message body scan using the store-and-forward logic;
responsive to the determination that the message body scan was completed during the proxy logic processing and the electronic message is accepted, queuing the electronic message for delivery.

19. The one or more computer storage devices of claim 18 having further computer-executable instructions comprising:
determining whether the delivery attempt did not complete prior to the timeout period, or the deliver attempt failed from a transient condition.

20. The one or more computer storage devices of claim 18 having further computer-executable instructions comprising:
connecting to a delivery system and
delivering the queued message, including re-attempting delivery if delivery failed due to a transient error.

* * * * *